Patented May 31, 1949

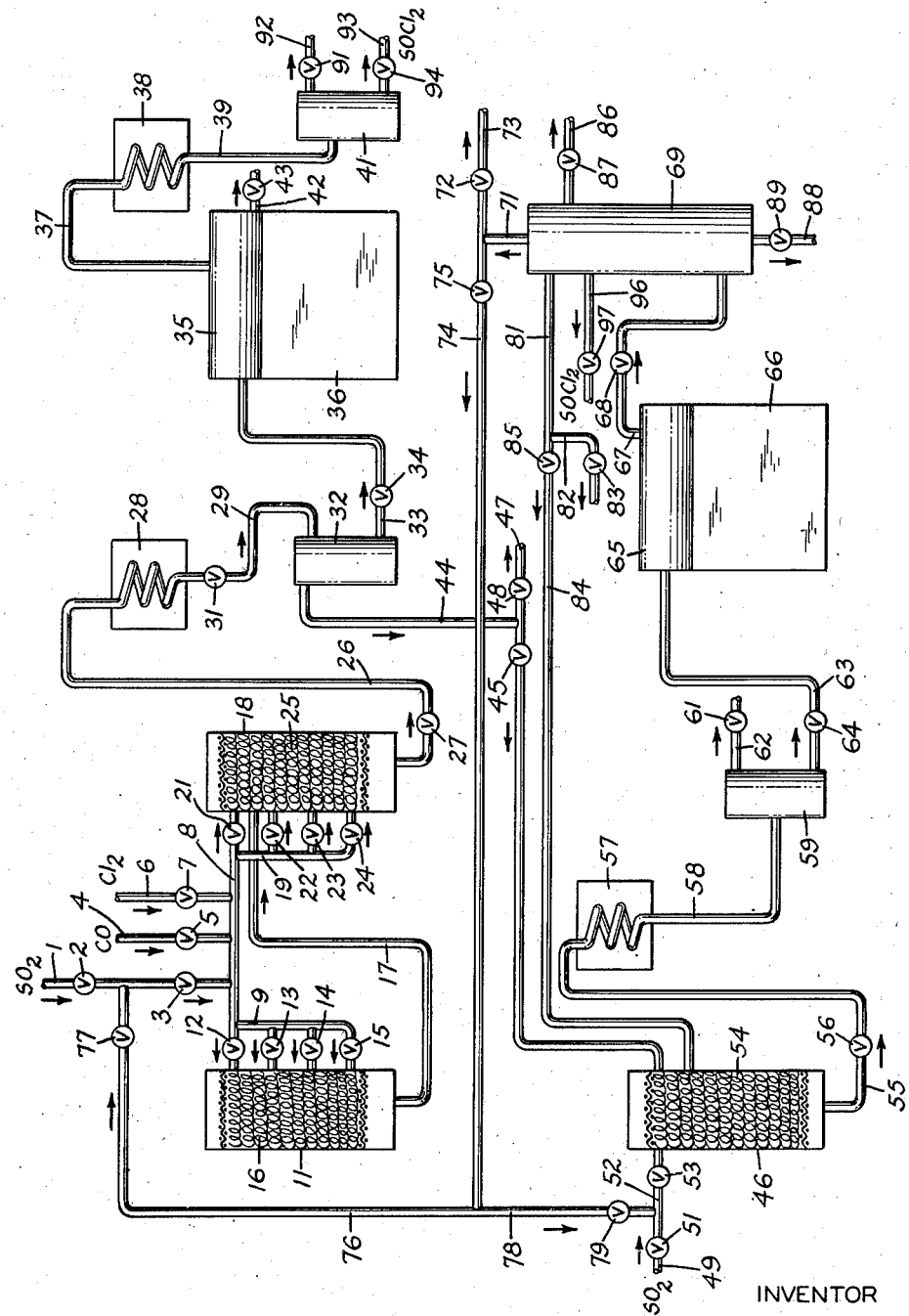

2,471,946

UNITED STATES PATENT OFFICE 2,471,946

PROCESS FOR MAKING THIONYL CHLORIDE

Edwin F. Fricke, Flushing, N. Y., assignor to Allied Chemical & Dye Corporation, New York, N. Y., a corporation of New York Application December 10, 1947, Serial No. 790,907

17 Claims. (Cl. 23—203)

This invention relates to the production of thionyl chloride and more particularly refers to a new and improved process for converting carbon monoxide, sulfur dioxide and chlorine into high yields of thionyl chloride.

In the conversion of carbon monoxide, sulfur dioxide and chlorine for the production of thionyl chloride, low yields of the desired product are obtained due to the incomplete conversion of some of the reactants and concomitant production of substantial quantities of byproducts which generally are sulfuryl chloride, phosgene, sulfur chloride, sulfur dichloride and sulfur tetrachloride. The thionyl chloride produced is usually of inferior quality, reddish in color and contaminated with byproducts difficult to remove. One of the factors contributing to the promotion of side reactions is the variable temperature in the catalyst zone resulting from the exothermic reaction of the reactant gases developing a temperature gradient in the catalyst bed with localized hot spots therein. Other causes of low yield and impure thionyl chloride product are inherent in the process when practiced in the conventional manner.

One object of the present invention is to provide an efficient, continuous process for converting carbon monoxide, chlorine and sulfur dioxide into thionyl chloride.

Another object of this invention is to provide a process for producing high yields of high quality thionyl chloride. A further object of this invention is to provide an improved process of regulating temperature conditions in the catalyst zone of a process for converting carbon monoxide, sulfur dioxide and chlorine into thionyl chloride. Further objects and advantages will be apparent from the description and accompanying drawing.

I have found that when carbon monoxide, sulfur dioxide and chlorine gases are subjected to successive zones of catalysts maintained at successively higher temperature within the range of 160° to 220° C., there is produced high yields of high purity thionyl chloride. A preferred method of carrying out this portion of my process involves passing carbon monoxide, sulfur dioxide and chlorine through a reaction zone containing active carbon catalyst maintained at a temperature of about 170° C. and passing the products of reaction from this zone together with additional carbon monoxide, sulfur dioxide and chlorine through a second reaction zone containing active carbon catalyst maintained at a temperature of about 200° C. Further, if the resulting products of the reaction after separation of the thionyl chloride are combined with additional sulfur dioxide and the mixture subjected to a catalyst maintained at a temperature within the range 280° to 350° C., an additional amount of thionyl chloride is obtained.

While I do not wish to predicate my invention on any theory of the mechanism of the reaction, the following equations and explanations indicate the probable course of the reaction:

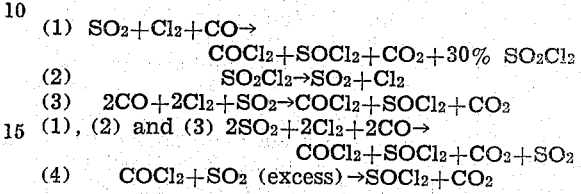

As seen from Equation 1, sulfur dioxide, chlorine and carbon monoxide combine to form phosgene, thionyl chloride, carbon dioxide, and approximately 30% sulfuryl chloride. This reaction occurs at a temperature ranging from approximately 160° to 180° C. in the presence of an activated carbon catalyst. Although not shown in Equation 1, some of the reactants remain unconverted. In addition, small amounts of sulfur chlorides may be formed. Increasing the temperature favors the production of sulfur chlorides and is therefore preferably avoided at this stage of the reaction.

Equations 2 and 3 represent an explanation of the reaction occurring in the second zone containing activated carbon, and maintained at a temperature between 180° and 220° C. The sulfuryl chloride under these conditions as shown in Equation 2 decomposes into sulfur dioxide and chlorine, which in turn combine with carbon monoxide to form additional thionyl chloride and phosgene, Equation 3. The products issuing from the second reaction zone consist of approximately equal mols of phosgene, thionyl chloride, carbon dioxide and sulfur dioxide together with a small amount of impurities and unreacted gases. An important advantage of catalytically treating carbon monoxide, chlorine and sulfur dioxide under the temperature conditions maintained in this reaction zone is the elimination of sulfuryl chloride and its partial conversion into thionyl chloride.

The thionyl chloride is then separated from the mixture and the remaining gases and vapors containing appreciable amounts of phosgene, together with added sulfur dioxide, when heated to a temperature ranging from 280° to 350° C. in the presence of an activated carbon catalyst, react to produce thionyl chloride and carbon dioxide, as illustrated in Equation 4. Thus, the remaining major byproduct, namely, phosgene, is transformed into thionyl chloride.

From the foregoing it will be apparent that my three-stage conversion under the temperature conditions set forth accomplishes highly efficient conversion of the chlorine and sulfur dioxide into thionyl chloride with a minor amount of undesirable compounds.

The accompanying drawing is a diagrammatic flow diagram illustrating the process of the present invention. The charging materials consisting of sulfur dioxide, carbon monoxide and chlorine from an external source are introduced into the system through line 1, valves 2 and 3; line 4, valve 5; and line 6, valve 7, respectively, into a common header 8. Preferably, the reactant gases are admixed in equimolecular proportions, although variations of 10% from the equimolecular proportions may be tolerated without too great a sacrifice in efficiency. The gases then flow into header 9 from which they may be introduced in regulated amounts into reaction chamber 11 at spaced points through valves 12, 13, 14 and 15 thereby effecting temperature control throughout the catalytic zone 16. The gases flow down through catalyst bed 16 composed of activated carbon in reaction chamber 11, wherein they are partially converted, and thence pass through line 17 into the top of reaction chamber 18, which is similar in construction to reaction chamber 11 and which also contains activated carbon catalyst.

A portion of the charging materials are fed through header 8 into header 19 and thence introduced into chamber 18 at spaced points by means of valves 21, 22, 23 and 24. Although not shown in the drawing, suitable provision for externally heating vessels 11 and 18 may be provided, as, for example, by means of electrical heating or a hot circulating fluid around the vessels. Since the reactions occurring in chambers 11 and 18 are highly exothermic, the temperatures within the chambers may be controlled by regulating the amounts of chlorine, sulfur dioxide and carbon monoxide introduced into the respective chambers, thereby minimizing formation of hot spots and promoting uniform temperature conditions in the catalyst bed. The temperature in the first reaction chamber 11 is maintained between 160° to 180° C., preferably at 170° C. and the second chamber 18 between 180° to 220° C., preferably at 200° C. Although separate chambers are shown in the drawing for holding the catalyst, a series of catalyst zones maintained at different temperatures may be incorporated in a single vessel. After the gases have contacted catalyst 25 in chamber 18, the reaction products are withdrawn from the bottom through line 26 and valve 27, thence through partial condenser 28, where a portion of the vapors are liquefied, and the mixture of gases and vapors pass through line 29 and valve 31 into vapor separating chamber 32. The condensate collected in the bottom of separator 32 is withdrawn through line 33 and valve 34 and introduced into shell still 35 supported on furnace 36. Vapors consisting of practically pure thionyl chloride are removed from the top of shell still 35 through line 37, condensed in cooler 38, and introduced through line 39 into receiver 41. The residue remaining in still 35 is withdrawn through line 42 and valve 43. In order to make the operation continuous, a multiplicity of stills 35 may be employed.

From the top of vapor separating chamber 32, phosgene, sulfur dioxide and other vapors and gases pass through line 44 and valve 45 into reaction chamber 46, which latter is of similar construction and contains the same catalyst as reaction chambers 11 and 18. If desired, all or a portion of the gaseous vapors released from the top of separating chamber 32 may be sent to storage through line 47 and valve 48. Additional sulfur dioxide is introduced through line 49, valve 51 and line 52, valve 53 into the top of reaction chamber 46. The reaction chamber is maintained at a temperature ranging from 280° to 350° C. by suitable heating means around the exterior of the vessel. As the phosgene and sulfur dioxide pass down through catalyst bed 54 in chamber 46, the vapors and gas are converted to thionyl chloride. The products of the reaction are removed from the bottom of reaction chamber 46 through line 55 and valve 56 into partial condenser 57 maintained at a temperature of approximately —30° C. or lower, whereby substantially all of the vapors and gaseous constituents, with the exception of carbon dioxide, are liquefied. The gas and liquid condensate flow from partial condenser 57 through line 58 into receiver 59. Carbon dioxide gas is released from the top of receiver 59 by means of valve 61 in line 62. The liquid accumulating in the bottom of receiver 59 is directed through line 63 and valve 64 into shell still 65 supported on furnace 66 for the purpose of converting it into vapors which are removed from the top of shell still 65 through line 67 and valve 68 into the lower portion of fractionating column 69, which latter serves the function of separating the liquid into fractions consisting of thionyl chloride and other byproducts of the reaction. Thionyl chloride is withdrawn from the system through conduit 96 and valve 97. Still 65 and fractionating column 69 are one form of apparatus, of which there are many, for separating mixtures of different boiling points. As an alternative method of operation, a pipe still and fractionating column may be employed or a series of shell stills may be utilized, wherein different boiling point fractions can be separated during the course of distillation. From the top of fractionating column 69, sulfur dioxide gas is released through line 71 and may be removed from the system by means of valve 72 in line 73. The preferable method of operation is to recycle the sulfur dioxide through line 74 and valve 75 to reaction chambers 11, 18 and 46 by means of line 76 and valve 77 or line 78 and valve 79. In some instances, phosgene may pass unconverted through reaction chamber 46 and enter fractionating column 69. I have found that catalyst inactivated by too long usage tends to incompletely convert the phosgene and therefore prefer frequent revivifications or replacements with fresh catalysts in chamber 46. Unconverted phosgene removed from the fractionator 69 through line 81 may be withdrawn from the system through line 82 and valve 83, or, preferably may be returned by means of line 84 and valve 85 to reaction chamber 46. The other two byproducts of any consequence consist of sulfur dichloride, which may be withdrawn from column 69 through line 86 and valve 87, and sulfur chloride, which may be removed from the bottom of the fractionating column 69 through line 88 and valve 89. If desired, the sulfur chloride and sulfur dichloride just mentioned may be combined with the sulfur chloride released from still 35 through line 42 and valve 43 and the mixture reacted with sulfur trioxide in the presence of an activated carbon catalyst to produce additional thionyl chloride.

Referring to the vapor separator 41, the liquid accumulating in the bottom of this separator consisting of practically pure thionyl chloride is discharged to storage through line 93 and valve 94. Unconverted reactant gases when released from the top of receiver 41 by means of valve 91 in line 92, can be returned to the system for further reaction.

Continuous operation may be assured by providing duplicate reaction chambers 11, 18 and 46. Thus when a catalyst becomes inactive and requires regeneration or replacement the standby vessel may be switched in thereby avoiding any loss of time due to shutdown. Ordinarily the activated carbon has good activity for several weeks operation after which it may be regenerated by heating to about 600° C. and passing air through it.

A specific example for practicing the process in accordance with the present invention is as follows:

A reaction chamber consisting of 12″ stainless steel standard pipe 8′ long, filled with approximately 6.3 cubic feet or 138 pounds of activated wood charcoal is first heated to a temperature of approximately 160° C. by means of electrical resistance elements around the exterior of the chamber. Carbon monoxide and chlorine are then introduced into the chamber and this is followed by the addition of sulfur dioxide gas. The products of reaction from this chamber are passed into a second similar chamber containing similar catalyst which had been previously heated to 190° C. Hereinafter, unless otherwise stated, all quantities will be expressed in terms of rate of net tons per 24 hours. After the temperature in the reaction chamber has risen to 170° C., it is maintained at this temperature and part of the reactants entering the first chamber are diverted to the second reaction chamber. The temperature in the second reaction chamber rises to 200° C. and is maintained at that point. When the operation is stabilized, the introduction of CO, $SO_2$ and $Cl_2$ in equimolecular proportions into the first and second reaction chambers is as follows:

| Charging Materials | First Chamber, Net Tons per 24 hours | Second Chamber, Net Tons per 24 hours |
|---|---|---|
| Chlorine | 0.510 | 0.335 |
| Carbon monoxide | 0.201 | 0.134 |
| Sulfur dioxide | 0.460 | 0.305 |

In order to minimize temperature gradients and localized hot spots in the catalyst beds as indicated by pyrometers inserted at various points therein, the reactants are introduced into the vessels at spaced points as indicated on the drawing.

The products of reaction issuing from the second reaction chamber comprising a mixture consisting primarily of thionyl chloride, phosgene, carbon dioxide and sulfur dioxide are cooled to a temperature of 10° to 15° C. and the liquid condensate consisting of thionyl chloride and traces of sulfur chloride then subjected to distillation. The resultant thionyl chloride weighing 0.710 net ton has the following specifications: colorless to pale yellow, approximately 1.644 specific gravity, a boiling point range of 74° to 78° C., and a thionyl chloride content of approximately 98% to 99%. This product is suitable, without any further treatment, for sale as refined-grade thionyl chloride.

The reaction products from the second catalyst zone after removal of thionyl chloride are admixed with 0.3825 net ton of additional sulfur dioxide and subjected to the action of active carbon catalyst in a reaction chamber similar to the previously described reaction chambers at a temperature maintained at approximately 310° C. The resultant products are cooled to about —30° C. to effect the release of uncondensed carbon dioxide and the condensate consisting mainly of sulfur dioxide, sulfur chlorides, thionyl chloride and phosgene fractionated to separate the mixture into its various components. Sulfur dioxide is returned to the system for reuse. The sulfur chlorides are removed and sent to storage. The thionyl chloride weighing 0.290 ton is of technical grade quality having a color yellow to pale red, a specific gravity of approximately 1.644, a boiling range of 72° to 79° C., and a thionyl chloride content of approximately 96% to 98%. This product, while not as pure as that produced from the previous reaction, is suitable for most commercial purposes.

The invention may be carried out at any convenient pressure, preferably at atmospheric or low superatmospheric pressures, i. e. about 25 to 50 pounds per square inch.

Although certain preferred embodiments of the invention have been disclosed for purposes of illustration, it will be evident that various changes and modifications may be made therein without departing from the scope and spirit of the invention which is not to be limited save as defined in the appended claims.

I claim:

1. A process for the production of thionyl chloride which comprises subjecting carbon monoxide, sulfur dioxide, and chlorine to successive zones of activated carbon catalysts maintained at increasing temperatures in the range of 160° C. to 220° C. to effect conversion into thionyl chloride and separating the thionyl chloride from the products of reaction.

2. A process as defined in claim 1 in which said temperature range is from 170° to 200° C.

3. A process for the production of thionyl chloride which comprises subjecting carbon monoxide, sulfur dioxide and chlorine to successive zones of activated carbon catalysts maintained at increasing temperatures in the range of 160° to 220° C. to effect conversion into thionyl chloride, separating the thionyl chloride from the products of reaction, subjecting the remaining products of reaction to the action of an activated carbon catalyst maintained at a temperature between 280° and 350° C., and separating the thionyl chloride produced in the last reaction zone.

4. A process for the production of thionyl chloride which comprises subjecting carbon monoxide, sulfur dioxide and chlorine to successive zones of activated carbon catalysts maintained at increasing temperatures in the range of 160° C. to 220° C. to effect conversion into thionyl chloride, separating the thionyl chloride from the products of reaction, subjecting the remaining products of reaction to the action of an activated carbon catalyst maintained at a temperature between 280° and 350° C., withdrawing the reaction products from said latter reaction zone, separating thionyl chloride and sulfur dioxide from said reaction products, and returning sulfur dioxide to the system for further conversion.

5. A process for the production of thionyl chloride which comprises subjecting carbon monoxide, sulfur dioxide and chlorine to successive zones of activated carbon catalysts maintained at increasing temperatures in the range of 160° to 220° C. to effect conversion into thionyl chloride, separating the thionyl chloride from the products of reaction, subjecting the remaining products of reaction to the action of an activated carbon catalyst maintained at a temperature between 280° and 350° C., separating the reaction products into fractions containing thionyl chloride, sulfur dioxide and phosgene, returning the unconverted phosgene to the catalyst zone maintained at a temperature between 280° and 350° C., and returning the sulfur dioxide to the system for further conversion.

6. A process for the production of thionyl chloride which comprises subjecting carbon monoxide, sulfur dioxide and chlorine to successive zones of activated carbon catalysts maintained at increasing temperatures in the range of 160° C. to 220° C. to effect conversion into thionyl chloride, separating thionyl chloride thereby produced from the products of reaction, subjecting the remaining products of reaction together with additional sulfur dioxide to the action of an activated carbon catalyst maintained at a temperature between 280° and 350° C., withdrawing said products of reaction from the latter catalyst zone, and separating thionyl chloride therefrom.

7. A process for the production of thionyl chloride which comprises subjecting carbon monoxide, sulfur dioxide, and chlorine to successive zones of activated carbon catalysts maintained at increasing temperatures in the range of 160° to 220° C. to effect conversion into thionyl chloride, separating thionyl chloride thereby produced from the products of reaction, subjecting the remaining products of reaction together with additional sulfur dioxide to the action of an activated carbon catalyst maintained at a temperature between 280° and 350° C., withdrawing the products of reaction, separating thionyl chloride and sulfur dioxide from said products of reaction, and returning sulfur dioxide to the system for further conversion.

8. A process for the production of thionyl chloride which comprises subjecting carbon monoxide, sulfur dioxide and chlorine to successive zones of activated carbon catalysts maintained at increasing temperatures in the range of 160° to 220° C. to effect conversion into thionyl chloride, regulating the temperature in each of said catalyst zones by the introduction of controlled amounts of reactants in each of said zones, and separating the thionyl chloride thereby produced from the products of reaction.

9. A process for the production of thionyl chloride which comprises subjecting carbon monoxide, sulfur dioxide and chlorine to successive zones of activated carbon catalysts maintained at increasing temperatures in the range of 160° to 220° C. to effect conversion into thionyl chloride, regulating the temperature in each of said catalyst zones by the introduction of controlled amounts of reactants in each of said zones, separating thionyl chloride thereby produced from the products of reaction, subjecting the remaining reaction products together with added sulfur dioxide in another zone to the action of an activated carbon catalyst maintained at a temperature between 280° and 350° C., withdrawing the products of reaction from said latter zone, and separating thionyl chloride therefrom.

10. A process for the production of thionyl chloride which comprises subjecting carbon monoxide, sulfur dioxide and chlorine to successive zones of activated carbon catalysts maintained at increasing temperatures in the range of 160° to 220° C. to effect conversion into thionyl chloride, regulating the temperature in each of said catalyst zones by the introduction of controlled amounts of reactants in each of said zones, separating thionyl chloride and sulfur dioxide from the products of reaction, and returning the sulfur dioxide to the system for further conversion.

11. A process for the production of thionyl chloride which comprises subjecting a mixture of sulfur dioxide, chlorine and carbon monoxide to the action of activated carbon at a temperature ranging from 160° to 180° C. in a first reaction zone, passing the reaction products from the first zone together with additional sulfur dioxide, chlorine and carbon monoxide into a second reaction zone containing activated carbon catalyst maintained at a temperature between 180° and 220° C., withdrawing the reaction products from the second reaction zone, and separating thionyl chloride from the reaction products.

12. A process for the production of thionyl chloride which comprises subjecting a mixture of sulfur dioxide, chlorine and carbon monoxide to the action of activated carbon at a temperature ranging from 160° to 180° C. in a first reaction zone, passing the reaction products from the first reaction zone together with additional sulfur dioxide, chlorine and carbon monoxide into a second reaction zone containing activated carbon catalyst maintained at a temperature between 180° and 220° C., regulating the temperatures of the reaction zones by the introduction of reactants at spaced points therein, withdrawing the reaction products from the second reaction zone, and separating thionyl chloride from said reaction products.

13. A process for the production of thionyl chloride which comprises subjecting an approximately equimolecular mixture of sulfur dioxide, chlorine and carbon monoxide to the action of activated carbon at a temperature ranging from 160° to 180° C. in a first reaction zone, passing the reaction products from the first reaction zone together with additional sulfur dioxide, chlorine and carbon monoxide into a second reaction zone containing activated carbon catalyst maintained at a temperature between 180° and 220° C., regulating the temperatures of the reaction zones by the introduction of reactant gases at spaced points therein, withdrawing the reaction products from the second reaction zone, and separating thionyl chloride from said reaction products.

14. A process for the production of thionyl chloride which comprises subjecting and approximately equimolar mixture of carbon monoxide, chlorine and sulfur dioxide to the action of activated wood carbon at a temperature of about 170° C. in a first reaction zone, passing the reaction products together with an additional amount of an equimolecular mixture of reactants into a second reaction zone containing activated wood carbon and maintained at a temperature of about 200° C., regulating the temperature in the first and second reaction zones by the introduction of reactant gases therein, cooling the effluent of the second reaction zone to a temperature from about 10° to 15° C., separating the uncondensed vapors and gases from the liquid condensate, distilling the liquid condensate to produce a fraction containing thionyl chloride and a second fraction containing sulfur chloride, passing the uncondensed vapors and gases together with added sulfur dioxide into a third reaction zone containing activated wood carbon and maintained at a temperature of about 310° C., cooling the reaction products from the third reaction zone to a temperature below —30° C., separating the uncondensed gases and vapors consisting primarily of carbon dioxide from the liquid condensate produced by the cooling, fractionally distilling the liquid condensate to produce fractions consisting primarily of thionyl chloride, sulfur dioxide, phosgene and sulfur chloride, recycling the sulfur dioxide as part of the charging material to the process, returning the unconverted phosgene to the third reaction zone, and reacting the sulfur chlorides together with the sulfur chloride produced in the first and second reaction zones with sulfur trioxide to produce additional thionyl chloride.

15. A process for the production of thionyl chloride which comprises passing a mixture of carbon monoxide, sulfur dioxide and chlorine through successive catalyst zones maintained at increasing temperatures, regulating the temperature in the catalyst zones by the introduction of controlled amounts of reactants in the catalyst zones, and separating the thionyl chloride thereby produced from the products of reaction.

16. A process for the production of thionyl chloride which comprises passing a mixture of carbon monoxide, sulfur dioxide and chlorine through a series of catalyst zones at elevated temperatures to effect conversion of the reactants into thionyl chloride, regulating the temperatures in the catalyst zones by the introduction of controlled amounts of reactants in the catalyst zones, and separating the thionyl chloride thereby produced from the products of reaction.

17. In a process for catalytically converting carbon monoxide, sulfur dioxide and chlorine into thionyl chloride, the improvement which comprises passing the reactants through a catalyst zone maintained at an elevated temperature, and regulating the temperature in the catalyst zone by the introduction of controlled amounts of reactants at spaced points in the catalyst zone.

EDWIN F. FRICKE.

No references cited.